United States Patent [19]
Hubbell

[11] Patent Number: 4,520,231
[45] Date of Patent: May 28, 1985

[54] SAFETY CAP FOR FENCE POSTS

[76] Inventor: Leslie A. Hubbell, 40260 County Rd. 13, Elizabeth, Colo. 80107

[21] Appl. No.: 561,907

[22] Filed: Dec. 15, 1983

[51] Int. Cl.[3] ........................ H01B 17/14; A01K 3/00
[52] U.S. Cl. ................................ 174/158 F; 174/175; 256/10; 256/48
[58] Field of Search ........................ 256/10, 47, 52, 48, 256/51; 174/93, 137 R, 145, 154, 158 F, 163 R, 175, 163 F; 52/244, 300, 301

[56] References Cited

U.S. PATENT DOCUMENTS

| | | | |
|---|---|---|---|
| 3,267,805 | 8/1966 | Ackerman | 88/82 |
| 3,801,731 | 4/1974 | Hansen | 174/163 |
| 3,807,698 | 4/1974 | Enoksson | 256/10 |
| 4,028,489 | 6/1977 | Berg, Jr. et al. | 174/175 |
| 4,049,905 | 9/1977 | Maranell | 174/163 |
| 4,077,611 | 3/1978 | Wilson | 256/10 |

FOREIGN PATENT DOCUMENTS

| | | | |
|---|---|---|---|
| 1303567 | 8/1962 | France | 174/175 |
| 2496327 | 6/1982 | France | 174/158 F |

OTHER PUBLICATIONS

T-Guard Installation Publication.
Photograph of Bar Guard, marketed by American All-safe Co.

*Primary Examiner*—Cornelius J. Husar
*Assistant Examiner*—Eric K. Nicholson
*Attorney, Agent, or Firm*—Sheridan, Ross, & McIntosh

[57] ABSTRACT

A safety cap having a body with integral inwardly projecting portions for providing resilient contact between the safety cap and a T-shaped fence post when the safety cap is placed thereover. The safety cap is also provided with means for supporting an electric wire and the inwardly projecting portions are located so that the safety cap may be placed in a desired one of two directions.

14 Claims, 4 Drawing Figures

SAFETY CAP FOR FENCE POSTS

FIELD OF INVENTION

This invention relates to the field of providing protection for animals and more specifically to a safety cap for metal T-shaped fence posts used with fences in rural areas so that horses and other animals will not be injured by contact with the T-shaped fence posts. The invention also relates to the field of supplying supports for an electrical wire which is sometimes used in conjunction with fences and posts of this nature.

BACKGROUND OF THE INVENTION

It has been customary for many, many years to provide barbed wire fences in rural areas so as to confine horses, cattle and other animals within a desired location. Many times, these barbed wire fences are supported by metal fence posts which for structural reasons are mostly T-shaped. The exposed top end of these T-shaped fence posts present a hazard to horses or othe animals that may be injured by accidental or desired contact with these fence posts. There have been some efforts made to provide protection for the animals. One such protection was a safety cap marketed under the trade designation T-Guard. However, many difficulties, such as easy removability and breaking, were experienced by users of this product. In many instances, an electric wire is used in conjunction with these fences and fence posts. The electric wire is sometimes located adjacent the arms of the T-shaped posts and sometimes adjacent the stem. Therefore, a universal support for these wires is desirable.

BRIEF SUMMARY OF THE INVENTION

This invention provides a safety cap for T-shaped fence posts which is shaped so that it may be installed over the fence post and not be easily removed therefrom. The safety cap also has means for supporting an electric wire. The cap is so designed that it may be used with fence posts having an electric wire adjacent the arms of a T-shaped post and also with fence posts having an electric wire adjacent the stem of a T-shaped fence post.

The preferred embodiment of the invention comprises an elongated generally hollow body having one open end and an integral dome shaped cover closing the other end. A first pair of spaced apart ribs extend inwardly from the inner surface of the body and form a generally U-shaped recess therebetween. These ribs extend in the longitudinal direction for substantially the whole length of the body. A second pair of spaced apart ribs extend inwardly from the inner surface of the body and extend in a longitudinal direction for substantially the whole length of the body. The first and second pair of ribs extend inwardly for only a relatively short distance so that only that portion of the stem of the T-shaped fence post adjacent the open end of the stem is located between said first pair of ribs and only that portion of each arm of the T-shaped fence post adjacent the open end of each arm is in contact with the second pair of ribs. The body is also provided with means for supporting an electric wire which means comprise a pair of spaced apart lugs extending outwardly from the outer surface of the body with a recess in one lug facing downwardly and a recess in the other lug facing upwardly said recess having dimensions so that the electrical wire may be received therein.

The body is further provided with a third pair of ribs similar to the first pair of ribs and located opposite to the first pair of ribs. Also, the body is provided with a fourth pair of ribs similar to the second pair of ribs and located opposite to the second pair of ribs. The first, second, third and fourth pair of ribs permit the safety cap to be used with fence posts having the electric wire adjacent either the stem or the arms of the T-shaped fence posts.

Other features and advantages of the invention will be apparent from the following more particular description of preferred embodiments as illustrated in the accompanying drawings in which like reference characters refer to the same parts throughout the various views. The drawings are not necessarily to scale, emphasis instead being placed upon illustrating the principles of the invention.

DETAILED DESCRIPTION OF THE INVENTION

Figure 1:
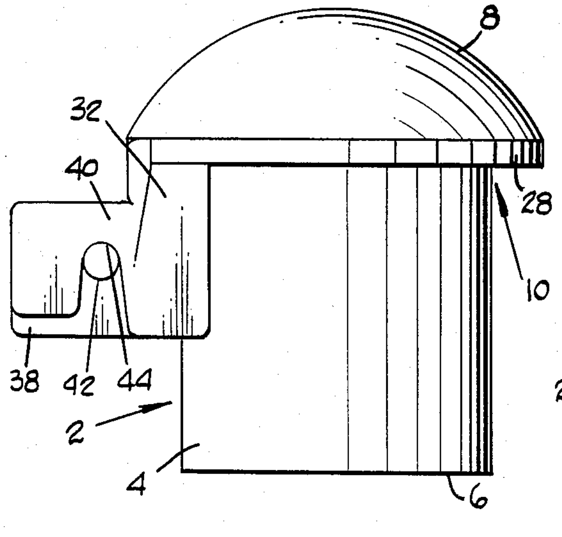
FIG. 1 is a side elevational view of a safety cap of this invention.
Figure 2:
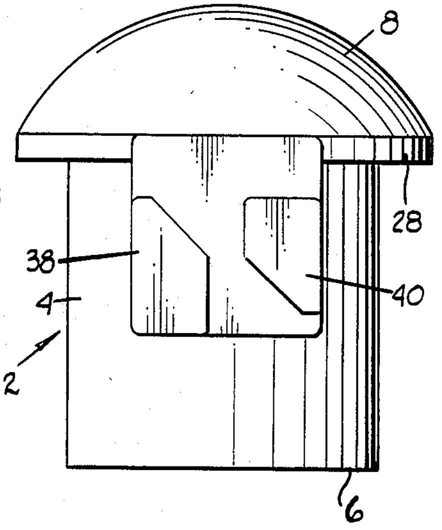
FIG. 2 is a front elevational view of FIG. 1.

As illustrated in the drawing, a safety cap 2 for T-shaped fence posts is provided wherein the safety cap 2 comprises an elongated generally hollow body 4 having an open end 6 and a cover 8 over the other end 10. A first pair of ribs 12 and 14 extend inwardly from the inner surface 16 of the body 4 and form between them a generally U-shaped recess 18 for receiving the open end of the stem of a T-shaped fence post as explained below. A second pair of ribs 20 and 22 extend inwardly from the inner surface 16 of the body 4 and are provided with surfaces 24 and 26 for contacting the arms of a T-shaped fence post adjacent the open ends thereof as explained below.

Figure 3:
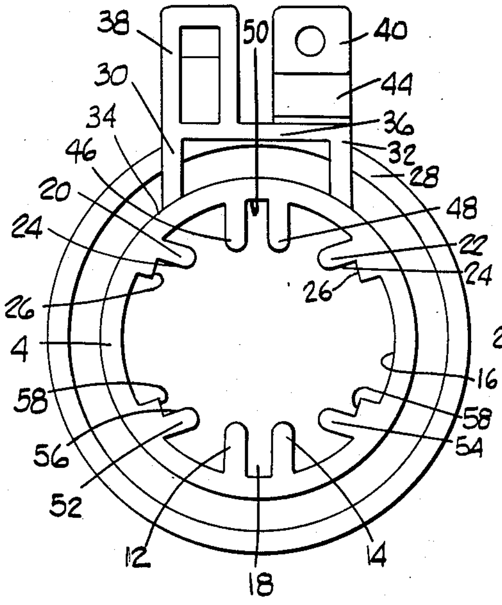
FIG. 3 is a bottom plan view of FIG. 1.
Figure 4:
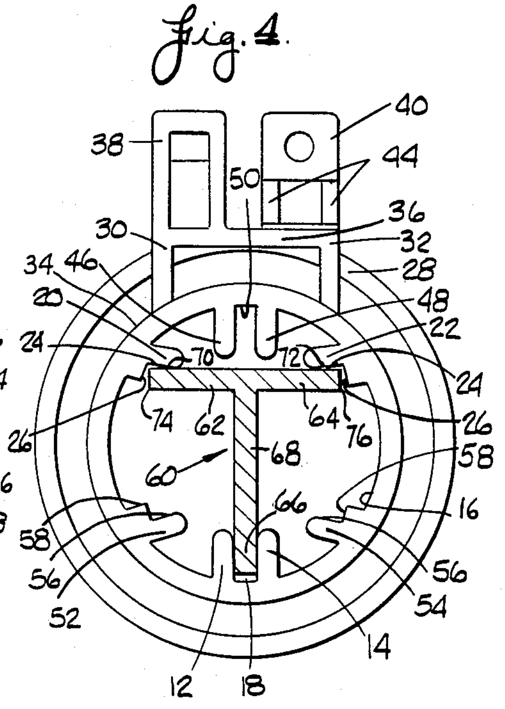
FIG. 4 is a bottom plan view of FIG. 1 in position over a T-shaped fence post.

The cover 8 is generally dome shaped and has a lower surface 28 which is below the end 10 of the body 4. The cover 8 is integral with the end 10 of the body 4. As illustrated in FIGS. 3 and 4, the lower surface 28 and the body 4 are each annular in horizontal cross-section with the inner diameter of the lower surface 28 being larger than the outer diameter of the body 4.

A pair of legs 30 and 32 extend outwardly from the outer surface 34 of the body 4 and are integral therewith. The legs 30 and 32 are integrally connected by a member 36. Projecting outwardly from the member 36 are a pair of lugs 38 and 40. The lug 38 has a upwardly facing recess 42 and the lug 40 has an downwardly facing recess 44. The recesses 42 and 44 are located and dimensioned so that an electric wire may be positioned therein and supported thereby.

A third pair of ribs 46 and 48 extend inwardly from the inner surface 16 of the body 4 and form between them a generally U-shaped recess 50 for receiving the open end of the stem of a T-shaped fence post as explained below. The third pair of ribs 46 and 48 are diametrically opposite to the first pair of ribs 12 and 14. A fourth pair of ribs 52 and 54 extend inwardly from the inner surface 16 of the body 4 and are provided with inner surfaces 56 and 58 for contacting the arms of a T-shaped fence post adjacent the open ends thereof as explained below.

The distance between the ends of the surfaces 24 of the ribs 20 and 22 and the bottom of the U-shaped recess 18 is less than the corresponding dimension of a T-shaped fence post so that when the safety cap is intalled the surfaces 24 will be pushed back so that they are in resilient contact with the adjacent surface of the arms of a T-shaped fence post. In another embodiment the medium distance between the surfaces 24 and the bottom of the U-shaped recess 18 is less than the corresponding dimension of a T-shaped fence post. In some instances it may also be desirable to provide for resilient contant between the surfaces 26 and the end surfaces 74 and 76 of the arms 62 and 64 of a T-shaped fence post. This can be accomplished by making the median distance between the surfaces 26 less than the distance between the end surfaces 74 and 76.

In putting a safety cap 2 over a T-shaped fence post 60 which is to be provided with an electric wire, it is first determined whether the electric wire is going to be adjacent the arms 62 and 64 of the T-shaped fence post 60 or adjacent the open end 66 of the stem 68 of the T-shaped fence post 60. In the embodiment illustrated in FIG. 4, the electric wire is adjacent the arms 62 and 64 so that the safety cap 2 is installed by placing the ends of the surfaces 24 and into contact with the surfaces 70 and 72 of the arms 62 and 64 adjacent the open ends thereof. Sufficient pressure is exerted on the safety cap 2 so as to flex the ribs 20 and 22 permitting the end 66 of the stem to enter into the U-shaped recess 18. A hammer is then used to strike the cover 8 and move the safety cap 2 down over the fence post until the safety cap 2 is in fully assembled position. When the distance between the ends of the arms of the T-shaped fence post is greater than the median distance between the surfaces 26 of the ribs 20 and 22, the edges of the arms may be embedded into the material at the juncture of the surfaces 24 and 26 as the safety cap 2 moves downwardly in response to the striking force of the hammer. Also, the body 4 will flex slightly to urge the surfaces 26 into firm and resilient contact with the ends surfaces 74 and 76 of the arms of the T-shaped fence post. If the electric wire is to be adjacent the end 66 of the stem 68, the ends of surfaces 56 are placed into contact with the surfaces 70 and 72 of the arms 62 and 64 and the foregoing procedure is then followed.

In the preferred embodiment, the body 4 has an inner diameter of about 1.780 inches, a wall thickness of about 1.780 inches, a wall thickness of 0.125 inches and an inner length of about 2.50 inches. The cover 8 is dome shaped with a spherical radius of about 1.562 inches, an outer diameter of about 2.750 inches and a wall thickness of about 0.125 inches. The ribs 20, 22, 52 and 54 extend inwardly for a distance of about 0.250 inches and have a wall thickness of about 0.250 inches and have a wall thickness of about 0.125 inches. The ribs 12, 14, 46 and 48 extend inwardly for a distance of about 0.375 inches and have a wall thickness of about 0.125 inches. Reinforcing ribs (not shown) integral with the inner surface of the cap 8 project downwardly into the body so that the ribs 12, 14, 46, 48, 20, 22, 52 and 54 have an effective length of about 2.375 inches. The median distance between the surfaces 24 and the bottom of the U-shaped recess 18 and the median distance between the surfaces 56 and the bottom of the U-shaped recess 50 is about 1.410 inches. The median distance between surfaces 26 and the median distance between surfaces 58 is about 1.375 inches. The lugs 38 and 40 extend outwardly from the rim of the cover 8 for a distance of 0.75 inches. The safety cap 2 is integrally molded and comprises a linear low density with polyethylene having a density of about 0.935 specific gravity.

While the preferred embodiments of the invention have been illustrated and described herein, it may be otherwise embodied and practiced within the scope of the following claims.

What is claimed is:

1. A cap useable with a T-shaped fence post comprising:

an elongated generally hollow body having an opening at one end thereof;

a cover over the other end of said body;

means for providing the inner surface of said body with at least two longitudinally extending surfaces for resiliently contacting each arm of said T-shaped fence post adjacent the open end of each arm;

a first pair of spaced apart ribs extending radially inward from the inner surface of said body;

said first pair of ribs extending in a longitudinal direction and forming a generally U-shaped recess adapted to receive therebetween the stem of a T-shaped fence post; and said first pair of ribs extending inwardly for only a relatively short distance so that only that portion of the stem of said T-shaped fence post adjacent the open end of said stem is located between said first pair of ribs.

2. A cap as in claim 1 wherein said means for providing said two longitudinally extending surfaces comprises:

at least a second pair of spaced apart ribs extending inwardly from the inner surface of said body;

said second pair of ribs extending in a longitudinal direction and adapted to be in contact with the arms of a T-shaped fence post; and said second pair of ribs extending inwardly for only a relatively short distance so that only that portion of each arm of said T-shaped fence post adjacent the open end of each arm is in contact with said second pair of ribs.

3. A cap as in claim 2 wherein:

said cover is integral with said body.

4. A cap as in claim 2 wherein:

said second pair of ribs comprise a material having semi-resilient properties and being of a sufficient thickness to resist movement in response to ordinary finger pressure.

5. A cap as in claim 4 wherein:

the distance between the bottom of said U-shaped recess and said second pair of ribs is less than the distance between the end of the stem and the arms of said T-shaped fence post so that said second pair of ribs are adapted to be in resilient contact with said arms of said fence post.

6. A cap as in claim 4 wherein:

the median distance between opposed surfaces of said second pair of ribs is less than the distance between the end surfaces of the arms of a T-shaped fence post so that said opposed surfaces are adapted to be in resilient contact with said end surfaces.

7. A cap as in claim 5 wherein:

said first and second pair of ribs are integral with said body.

8. A cap as in claim 7 and further comprising:

a pair of spaced apart lugs extending outwardly from said the outer surface of said body;

one of said lugs having a recess facing downwardly;

the other of said lugs having a recess facing upwardly; and each of said recesses adapted to receive an electric wire.

9. A cap as in claim 8 and further comprising:

a third pair of spaced apart ribs extending inwardly from the inner surface of said body and located opposite to said first pair of ribs;

said third pair of ribs extending in a longitudinal direction and forming a U-shaped recess adapted to receive the stem of a T-shaped fence post;

a fourth pair of spaced apart ribs extending inwardly from the inner surface of said body;

said fourth pair of ribs extending in a longitudinal direction and adapted to be in contact with the arms of a T-shaped fence; and said fourth pair of ribs extending inwardly for only a relatively short distance so that only that portion of each arm of said T-shaped fence post is in contact with said fourth pair of ribs.

10. A cap as in claim 9 wherein:

said fourth pair of ribs comprise a material having semi-resilient properties and being of a sufficient thickness to resist movement in response to ordinary finger pressure.

11. A cap as in claim 10 wherein:

the distance between the bottom of said U-shaped recess and said fourth pair of ribs is less than the distance between the end of the stem and the arms of said T-shaped fence post so that said fourth pair of ribs are in resilient contact with said arms of said fence post.

12. A cap as in claim 11 wherein:

said body; said cover; said first, second, third and fourth ribs and said lugs are integral.

13. A cap as in claim 12 wherein:

said body; said cover; said first, second, third and fourth ribs and said lugs comprise a white polyethylene.

14. A cap as in claim 13 wherein:

said body is cylindrical; and said cover is dome shaped with a diameter greater than the diameter of said body.

* * * * *